(12) United States Patent
Hoying et al.

(10) Patent No.: US 9,469,443 B2
(45) Date of Patent: Oct. 18, 2016

(54) MULTILAYER PLASTIC FILM (75) Inventors: David J. Hoying, Cincinnati, OH (US); Shaun T. Broering, Fort Thomas, KY (US); Matthew W. Waldron, Hamilton, OH (US); Daniel C. Peck, Mason, OH (US); Robert H. Turner, Cincinnati, OH (US)

(73) Assignee: The Glad Products Company, Oakland, CA (US)

( * ) Notice: Subject to any disclaimer, the term of this patent is extended or adjusted under 35 U.S.C. 154(b) by 871 days.

(21) Appl. No.: 12/881,825

(22) Filed: Sep. 14, 2010

(65) Prior Publication Data

US 2012/0063704 A1 Mar. 15, 2012

(51) Int. Cl.
*B65D 33/28* (2006.01)
*B65D 33/16* (2006.01)
*B32B 27/08* (2006.01)
*B32B 27/32* (2006.01)

(52) U.S. Cl.
CPC .............. *B65D 33/28* (2013.01); *B32B 27/08* (2013.01); *B32B 27/32* (2013.01); *B65D 33/165* (2013.01); *Y10T 428/3192* (2015.04); *Y10T 428/31504* (2015.04); *Y10T 428/31736* (2015.04); *Y10T 428/31746* (2015.04); *Y10T 428/31797* (2015.04); *Y10T 428/31913* (2015.04)

(58) Field of Classification Search
USPC .............. 383/75, 109, 112, 113, 114, 71, 72, 383/110, 115
See application file for complete search history.

(56) References Cited

U.S. PATENT DOCUMENTS

| | | | | | |
|---|---|---|---|---|---|
| 3,494,457 | A | * | 2/1970 | Titchenal | 206/484 |
| 3,738,567 | A | * | 6/1973 | Ruda | 383/75 |
| 3,857,144 | A | | 12/1974 | Bustin | |
| 4,151,318 | A | * | 4/1979 | Marshall | 383/116 |
| 4,253,507 | A | * | 3/1981 | Williamson | 383/6 |
| 4,302,495 | A | | 11/1981 | Marra | |
| 4,323,586 | A | * | 4/1982 | Long | 426/412 |
| 4,343,848 | A | | 8/1982 | Leonard, Jr. | |
| 4,657,133 | A | * | 4/1987 | Komatsu et al. | 206/204 |
| 4,816,093 | A | * | 3/1989 | Robbins, III | 156/69 |
| 4,890,936 | A | * | 1/1990 | Cooper | 383/109 |
| 4,930,905 | A | | 6/1990 | Sharps, Jr. | |
| 5,013,290 | A | * | 5/1991 | DeMatteis | 493/196 |
| 5,100,721 | A | | 3/1992 | Akao | |
| 5,518,801 | A | | 5/1996 | Chappell et al. | |
| 5,679,423 | A | * | 10/1997 | Shah | 428/35.2 |
| 5,804,265 | A | * | 9/1998 | Saad et al. | 428/35.2 |

(Continued)

FOREIGN PATENT DOCUMENTS

| | | | |
|---|---|---|---|
| WO | WO9013702 | 11/1990 | |
| WO | WO9956953 | 11/1999 | |
| WO | WO 2006135562 A2 * | 12/2006 | ............... B65F 1/00 |

*Primary Examiner* — Jes F Pascua
*Assistant Examiner* — Nina Attel
(74) *Attorney, Agent, or Firm* — Thomas C. Feix (57) ABSTRACT

A thermoplastic bag suitable for use as a liner for a garbage canister or trash receptacle may be made from a multi-layered thermoplastic web material. The multi-layer web material may include a first layer and a second layer adjacent to the first layer. Under typical conditions, the layers may tend to block or adhere together to remain in their adjacent position. However, the layers may delaminate and separate from each other when sufficient forces are applied. Delamination of the layers allows the layers to move with respect to each other when the force is applied. The delaminating of the layers absorbs energy which may increase tear and puncture resistance.

20 Claims, 11 Drawing Sheets

(56) References Cited

U.S. PATENT DOCUMENTS

| | | | | |
|---|---|---|---|---|
| 5,881,883 | A * | 3/1999 | Siegelman | 206/720 |
| 6,312,742 | B1 * | 11/2001 | Wood et al. | 426/122 |
| 6,361,784 | B1 | 3/2002 | Brennan et al. | |
| 6,385,818 | B1 | 5/2002 | Savicki, Sr. | |
| 7,306,729 | B2 | 12/2007 | Bacino et al. | |
| 7,712,962 | B1 * | 5/2010 | Reuhs et al. | 383/111 |
| 2002/0074691 | A1 | 6/2002 | Mortellite et al. | |
| 2005/0230419 | A1 * | 10/2005 | Safian | B05B 11/0043 222/105 |
| 2006/0093766 | A1 | 5/2006 | Savicki et al. | |
| 2006/0165319 | A1 * | 7/2006 | Patridge et al. | 383/107 |
| 2007/0166503 | A1 | 7/2007 | Hannigan | |
| 2007/0260016 | A1 * | 11/2007 | Best et al. | 525/240 |
| 2008/0124461 | A1 | 5/2008 | Leener et al. | |
| 2008/0226207 | A1 * | 9/2008 | Frayne | 383/109 |
| 2008/0233375 | A1 * | 9/2008 | Wright et al. | 428/219 |
| 2008/0258356 | A1 * | 10/2008 | Van Hove | B29B 11/14 264/535 |
| 2009/0029114 | A1 | 1/2009 | Cancio et al. | |
| 2009/0174102 | A1 * | 7/2009 | Iwahashi | A61F 9/0008 264/40.1 |
| 2010/0109206 | A1 * | 5/2010 | Hutchinson | B29C 45/045 264/513 |

* cited by examiner

MULTILAYER PLASTIC FILM

BACKGROUND

Thermoplastic bags are often used as disposable garbage receptacle liners which may be placed in and secured to a rigid garbage container and which, after being filled with garbage and refuse, may be removed from the container and disposed of. The plastic bags are typically made from thin, planar thermoplastic sheet-like films or webs. The webs are configured and arranged into the form or shape of a bag in which the webs serve as the sidewalls that delineate an enclosed interior volume. The webs may have a sufficient strength to resist rupture or puncture from objects that are inserted into the bag for disposal. Factors that may contribute to the strength of the bag are the type of thermoplastic material and the dimensional thickness of the webs. Another manner of optimizing the strength of the bag may be to make the webs from multiple layers of different thermoplastic materials. However, bags made from multilayered materials may still be subject to tearing or puncture, such as, when objects are abruptly dropped into the bag.

BRIEF SUMMARY

The bag may include a first sidewall that is overlaid and may be joined along its edges to a second sidewall to delineate an enclosed interior volume. To access the interior volume, a portion of the first and second sidewalls remain un-joined along their edges to define an opening. To increase the strength of the bag, the thermoplastic web material may be made as a multilayered structure having layers of thermoplastic materials. The materials may be selected so that the layers have a tendency to remain cohesively adjacent to each other when the bag is unstressed or used under normal conditions. However, the materials may also be selected so that the adjacent layers may delaminate or separate from each other when subjected to sufficiently large or sudden stresses or forces. This allows the adjacent layers to move or slide with respect to each other. When used as a liner for a garbage receptacle, the delaminating of the layers absorbs energy which may increase the tear and puncture resistance.

A sheet-like film or web of multilayered thermoplastic material may be used for making the bag. The materials of the layers may be selected so that the layers will delaminate or separate from each other when subjected to a sufficiently large or sudden stress or force. One of the layers may include anti-blocking additives or agents that may reduce the tendency of that layer to block or stick with other layers within the web. The anti-blocking additives may facilitate the ability of the layers to delaminate and slide with respect to each other. In other embodiments, the layers may be made from thermoplastic materials selected to have a reduced tendency to stick physically adjacent to each other. Also provided are various processing techniques for molding or extruding the multilayered web from thermoplastic material.

An advantage of the thermoplastic liner bag and multi-layer web may be heightened strength and an increased resistance to puncture. This and further advantages and features will be apparent from the following drawings and description of the embodiments.

DESCRIPTION

Figure 1:
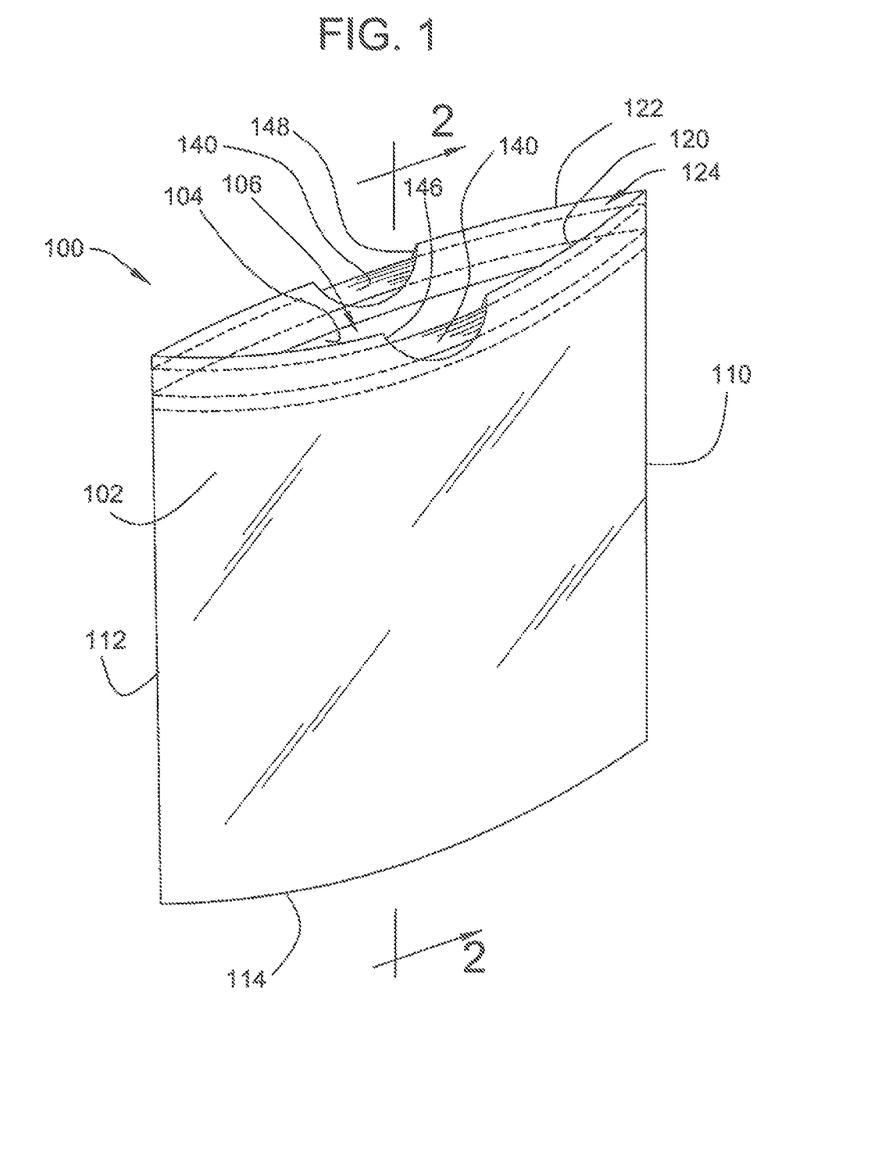
FIG. 1 is a perspective view of a thermoplastic bag suited for use as a trash receptacle liner, the illustrated bag including a draw tape.

Referring to the FIG. 1, there is illustrated an embodiment of a thermoplastic bag 100 suitable for use as a liner for trash receptacles or containers. The bag 100 may include a first sidewall 102 and an opposing second sidewall 104 overlaying and joined to the first sidewall to provide an interior volume 106 therebetween. The sidewalls 102, 104 may be made from pliable, flexible thermoplastic material. The first and second sidewalls 102, 104 may be rectangular in shape and may be joined along a first side edge 110, a second side edge 112, and a closed bottom edge 114 that extends between the first and second side edges. The side edges may be joined together by any suitable means such as heat sealing.

Figure 2:
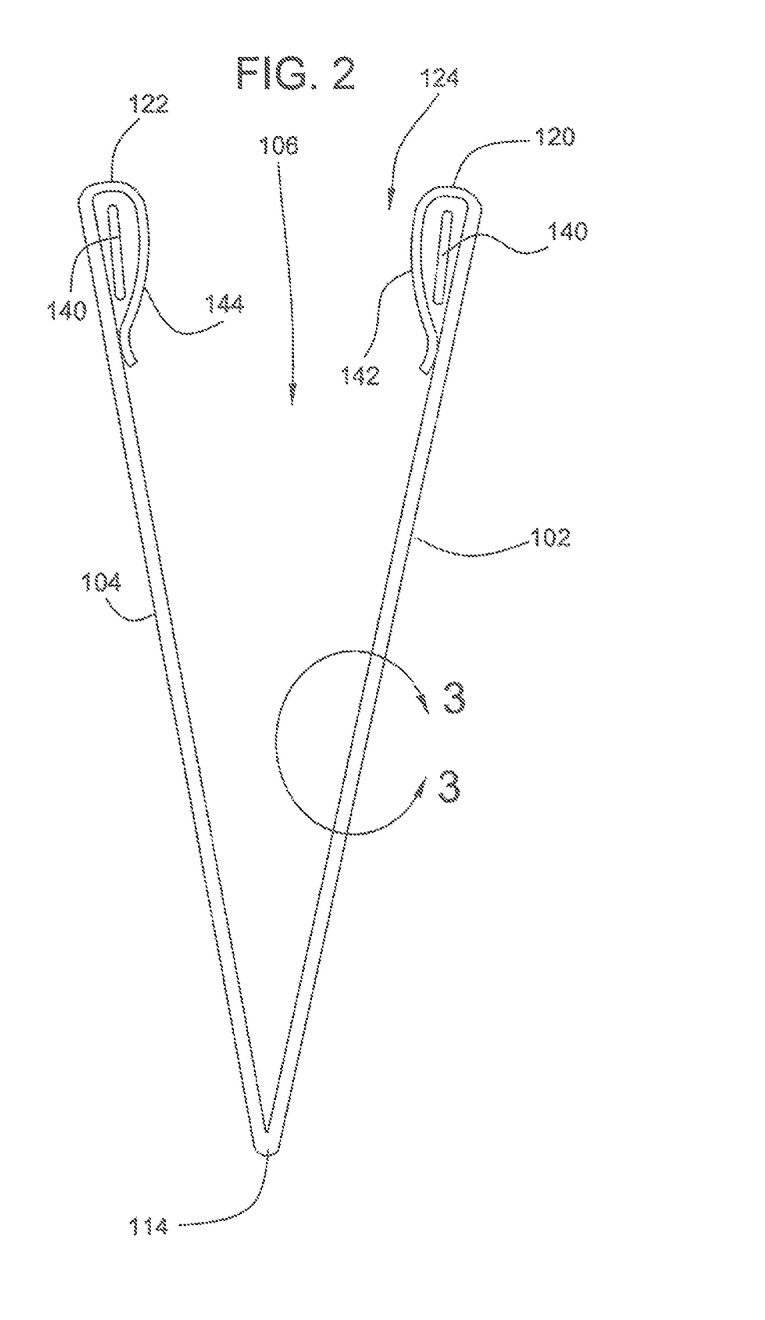
FIG. 2 is a cross-sectional view taken along lines 2-2 of FIG. 1.

For accessing the interior volume 106 to insert items, such as, refuse or garbage, the top edges 120, 122 of the first and second sidewalls 102, 104 may remain un-joined to define an opening 124 located opposite the closed bottom edge 114. When placed in a trash receptacle, the top edges 120, 122 of the first and second sidewalls 102, 104 may be folded over the rim of the receptacle. To close the opening 124 of the bag 100, the bag may be fitted with a draw tape 140. To accommodate the draw tape 140, referring to FIG. 2, the first top edge 120 of the first sidewall 102 may be folded back into the interior volume 106 and attached to the interior surface of the sidewall to form a first hem 142. Similarly, the second top edge 122 of the second sidewall 104 may be folded back into the interior volume and attached to the second sidewall to form a second hem 144. In other embodiments, the top edges may be folded to the exterior and attached to the exterior of the sidewalls. Referring to FIGS. 1 and 2, the draw tape 140, which may be fixedly attached at the first and second side edges 110, 112, may extend along the first and second top edge 120, 122 through the first and second hems 142, 144. To access the draw tape 140, first and second notches 146, 148 may be disposed through the respective first and second top edges 120, 122. Pulling the draw tape 140 through the notches 146, 148 will constrict the top edges 120, 122 thereby closing the opening 124.

Figure 3:
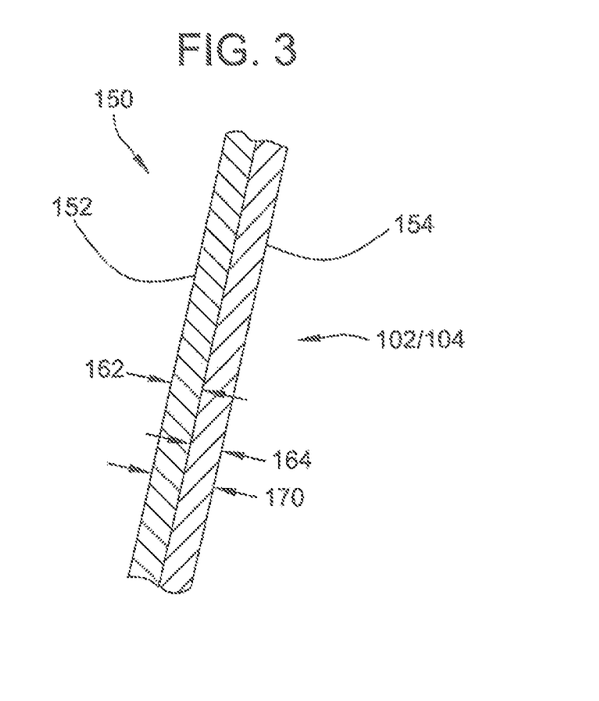
FIG. 3 is a view taken of the area indicated by circle 3-3 of FIG. 2, illustrating a multilayered construction of the web used to form the thermoplastic sidewalls.

Referring to FIG. 3, the sidewalls 102, 104 may be made from a web 150 having multiple layers of thermoplastic material. For example, the web 150 used for the sidewalls may include a first layer 152 and an adjacent second layer 154 which may be of the same or different thicknesses. The first layer 152 may have a thickness 162. The thickness 162 may have a first range from about 0.00005 inches (0.000127 cm) to about 0.01 inches (0.0254 cm), a second range from about 0.0001 inches (0.000254 cm) to about 0.005 inches (0.0127 cm), and a third range from about 0.0002 inches (0.000508 cm) to about 0.002 inches (0.00508 cm). In one embodiment, the thickness 162 may be about 0.0005 inches (0.00127 cm). The second layer 154 may have a thickness 164. The thickness 164 may have a first range from about 0.00005 inches (0.000127 cm) to about 0.01 inches (0.0254 cm), a second range from about 0.0001 inches (0.000254 cm) to about 0.005 inches (0.0127 cm), and a third range from about 0.0002 inches (0.000508 cm) to about 0.002 inches (0.00508 cm). In one embodiment, the thickness 164 may be about 0.0003 inches (0.000762 cm). The web 150 may have a thickness 170. The thickness 170 may have a first range from about 0.0001 inches (0.000254 cm) to about 0.01 inches (0.0254 cm), a second range from about 0.0002 inches (0.000508 cm) to about 0.005 inches (0.0127 cm), and a third range from about 0.0004 inches (0.000102 cm) to about 0.003 inches (0.00762 cm). In one embodiment, the thickness 170 may be about 0.0008 inches (0.00203 cm).

The layers may be made from flexible or pliable thermoplastic material that may be formed or drawn into a web or sheet. Examples of suitable thermoplastic materials may include polymers, such as, polyethylene (such as, high density polyethylene, low density polyethylene, medium density polyethylene, linear low density polyethylene, very low density polyethylene), polypropylene, polystyrene, ethylene vinyl acetate, nylon, polyester, ethylene vinyl alcohol, or other materials, and may be formed in combinations or mixtures of materials. When used as a garbage can liner, the thermoplastic material may be opaque but in other applications may be transparent, translucent, or tinted. Furthermore, the material used for the webs that make the sidewalls may be a gas impermeable material. MDPE is defined by a density range of 0.926-0.940 g/cm$^3$. MDPE can be produced by chromium/silica catalysts, Ziegler-Natta catalysts or metallocene catalysts. MDPE has good shock and drop resistance properties. LLDPE is defined by a density range of 0.915-0.925 g/cm$^3$. LLDPE is a substantially linear polymer with significant numbers of short branches, commonly made by copolymerization of ethylene with short-chain alpha-olefins (for example, 1-butene, 1-hexene and 1-octene). LLDPE exhibits higher impact and puncture resistance than MDPE. VLDPE is defined by a density range of 0.880-0.915 g/cm$^3$. VLDPE is a substantially linear polymer with high levels of short-chain branches, commonly made by copolymerization of ethylene with short-chain alpha-olefins (for example, 1-butene, 1-hexene and 1-octene). VLDPE is most commonly produced using metallocene catalysts due to the greater co-monomer incorporation exhibited by these catalysts.

The materials of the layers 152, 154 may be selected to remain cohesively adjacent to and in contact with each other as illustrated in FIG. 3, but not to have such that cohesive compatibility that the will not delaminate under sufficient peal force. Therefore, adjacent layers suitable for delamination will not be of the same material. For example, the first layer 152 may be a very low density polyethylene with a low molecular weight olefin based copolymer, such as, that marketed by Dow Chemical Company under the trade name Flexomer™ 9066 and the second layer 154 may be linear low density polyethylene, such as, that marketed by Dow Chemical under the trade name Dowlex™2045. These materials may tend to adhere or stick to each other and thus keep the web as a unitary structure when the web is not subjected to stress or force above a predetermined amount. The tendency of thermoplastic sheet or film materials to adhere and stick together at their surfaces is sometimes referred to as "blocking."

The thermoplastic materials may also be selected so that the first and second layers may delaminate and sheer apart from each other when a force of a sufficient amount is applied to the layers. For example, referring to FIG. 4, the first layer 152 may delaminate and partially separate from the second layer 154 when a sheering force 172 is applied to the first and second layers 152, 154. Accordingly, the multi-layered web may normally remain intact except when the predetermined sheering forces are applied.

Figure 4:
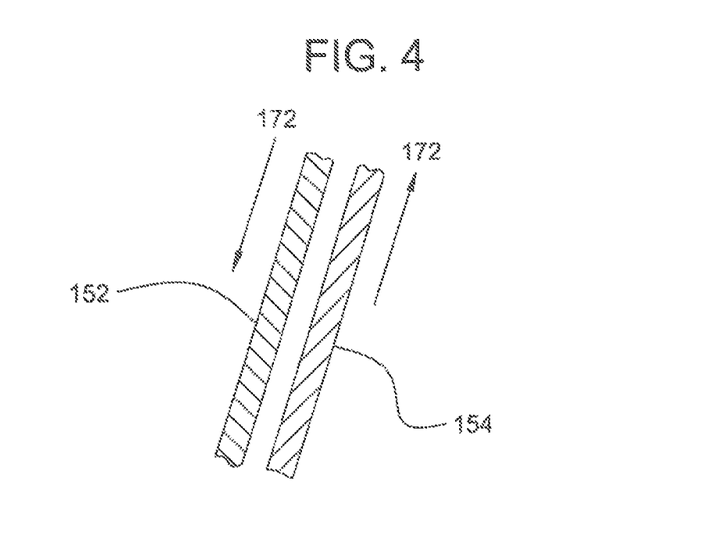
FIG. 4 is a cross-sectional view of the thermoplastic web illustrated in FIG. 3 showing the layers in a delaminated state.

Delamination and separation of the layers 152, 154 may allow the layers to move or slide with respect to each other. An advantage of allowing the layers 152, 154 to delaminate and partially separate from each other when such forces are applied to the web may be an increased resistance to tearing or puncture due to energy absorption of the delaminating layers. When an abrupt force is applied to the sidewall of a bag, delamination and separation of the layers 152, 154 may dissipate some of the applied force by, for instance, allowing the layers to move or slide with respect to each other. Thus, when the bag is used as a liner for a trash receptacle and objects are dropped into the interior volume, the bag may resist tearing and spilling of the contents.

Figure 12:
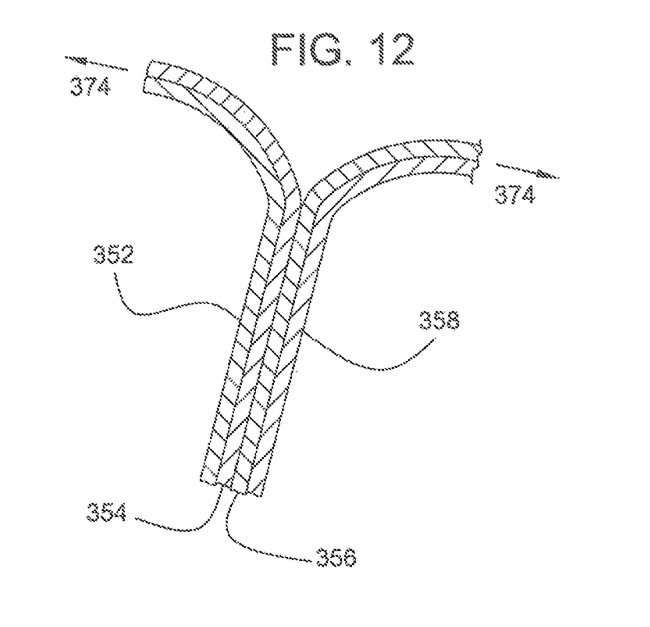
FIG. 12 is a cross-sectional view of the thermoplastic web illustrated in FIG. 9 showing the delamination of the layers during the peel test.

The peel force between layer 150 and layer 152 may have the same peel force information as the peel force information (including the force ranges and the force for the one embodiment) as noted with respect to peel force 374 in FIG. 12.

To enable the first and second layers 152, 154 to delaminate and separate from each other, additives may be included with the thermoplastic materials making up the first and second layers. The additives may include anti-block additives that may resist the tendency of the layers to adhere or stick together. Anti-blocking agents may be organic or inorganic materials that may be added to the thermoplastic material when it is mixed and extruded or molded from resin, or may be added after the thermoplastic webs have been formed. Examples of inorganic anti-blocking additives may include talc (magnesium silicate), calcium carbonate (CaC03), silica (silicon dioxide (Si02)), spheres (such as, manmade spheres; for example, zeospheres or ceramic spheres (alumina-silicate ceramic)), kaolin/clay (aluminum silicate), mica (aluminum potassium silicate), other materials, or combinations thereof. The presence of anti-blocking additives at the surfaces of the layers may tend to cause a roughening effect so that the adjacent surfaces may not be in perfect surface-to-surface contact with each other along their entire surface areas. Examples of organic anti-block additives may be bis-amide (ethylene bisstearamide (EBS)), secondary amide (stearyl erucamide), primary amide (stearamide, erucamide), organic stearate (glycerol monostearate (GMS)), metallic stearate (zinc stearate), silicone, PTFE, or other materials, or combinations thereof. The anti-block additive may be a combination of inorganic and organic materials. One example of an anti-block additive is Formulation 100526 marketed by Ampacet Corporation. For example, Ampacet Formulation 100526 may include two anti-block materials: microtalc (talc), and acrawax C (ethylene bisstearamide).

Other additives may include process aids. For example, the layers may include a slip additive. The slip additive may be a fatty acid. The slip additive may be long-chain fatty acid amides, with amides from oleyl (single unsaturated C-18) through erucyl (C-22 single unsaturated). One additive may be Formulation 10919 marketed by Ampacet Corporation. Ampacet Formulation 10919 may include a 3% loading of Dynamar. Dynamar is a fluoroelastomer and may prevent melt fracture during the extrusion process. The layers may include pigments. The layers may include fillers, such as, inorganic materials, such as, calcium carbonate, or organic materials, such as, starches. The materials may be particles, such as, spherical particles, shaped particles, or nanoparticles.

In another embodiment, the layers 152, 154 may be selected from dissimilar thermoplastic materials that may tend not to stick or adhere to each other. Suitable combinations of such materials for the first layer may include very low density polyethylene and for the second layer may include linear low density polyethylene, such as those discussed herein. However, the layers may demonstrate some level of adhesion or coherence so that the sidewalls will remain intact when the bag is in an unstressed condition.

Figure 5:
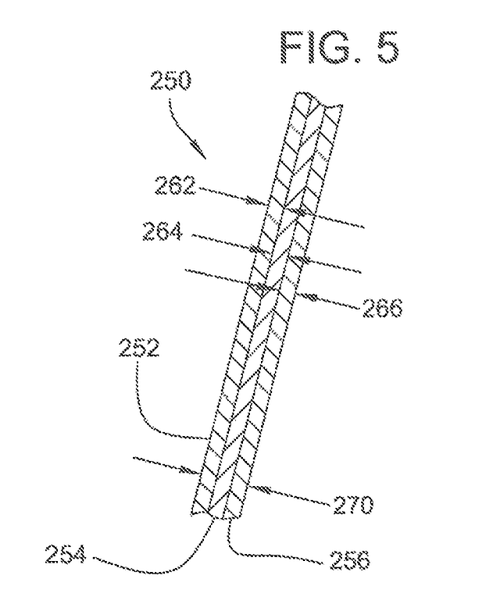
FIG. 5 is a cross-sectional view illustrating another embodiment of a multilayered construction.

Referring to FIG. 5, there is illustrated another embodiment of a multi-layer thermoplastic web 250 that may be used to make liner bags. The sidewalls 102, 104 may be made from a web 250 having multiple layers of thermoplastic material. For example, the web 250 may include a first layer 252, a second layer 254 and a third layer 256 which may be of the same or different thicknesses. The first layer 252 may have a thickness 262. The thickness 262 may have the same dimensional information as thickness 162. The second layer 254 may have a thickness 264. The thickness 264 may have the same dimensional information as thickness 164. The third layer 256 may have a thickness 266. The thickness 266 may have the same dimensional information as thickness 162. The web 250 may have a thickness 270. The thickness 270 may have the same dimensional information as thickness the combination of two layers of 162 and one layer of 164.

The layers may be made from flexible or pliable thermoplastic material that may be formed or drawn into a web or sheet. Examples of suitable thermoplastic materials may include polymers, such as, polyethylene (such as, high density polyethylene, low density polyethylene, medium density polyethylene, linear low density polyethylene, very low density polyethylene), polypropylene, polystyrene, ethylene vinyl acetate, nylon, polyester, ethylene vinyl alcohol, or other materials, and may be formed in combinations or mixtures of materials.

The materials of the layers 252, 254 and 256 may be selected to remain cohesively adjacent to and in contact with each other as illustrated in FIG. 5. For example, the first layer 252 may be a very low density polyethylene with a low molecular weight olefin based copolymer, such as, that marketed by Dow Chemical Company under the trade name Flexomer™ ETS 9066 NT7 or the first layer 252 may be a linear low density polyethylene, such as, that marketed by Dow Chemical under the trade name Dowlex™ 2045. The second layer 254 may be linear low density polyethylene with a hexene copolymer, such as, that marketed by Dow Chemical Company, or the second layer 154 may be a very low density polyethylene, such as, that marketed by Dow Chemical under the trade name Flexomer™ 9066. The third layer 256 may be the same as or similar to the first layer 252, while the second layer may be of a different material.

The thermoplastic materials may also be selected so that the first layer, the second layer and/or the third layer may delaminate when a force of a sufficient amount is applied to the layers. For example, referring to FIG. 6, the first layer 252 may delaminate and partially separate from the second layer 254 when a sheer force 272 is applied to the first and second layers 252, 254. As another example, referring to FIG. 7, the second layer 254 may delaminate and partially separate from the third layer 256 when a sheer force 272 is applied to the second and third layers 254, 256. As another example, referring to FIG. 8, the first layer 252 may delaminate and partially separate from the second layer 254 and the second layer 254 may delaminate from the third layer 256 when a sheer force 272 is applied to the layers 252, 254, 256.

Figure 6:
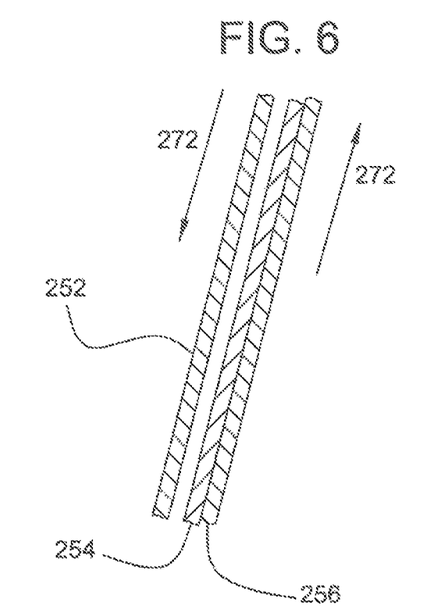
FIG. 6 is a cross-sectional view of the thermoplastic web illustrated in FIG. 5 showing the layers in a delaminated state.
Figure 7:
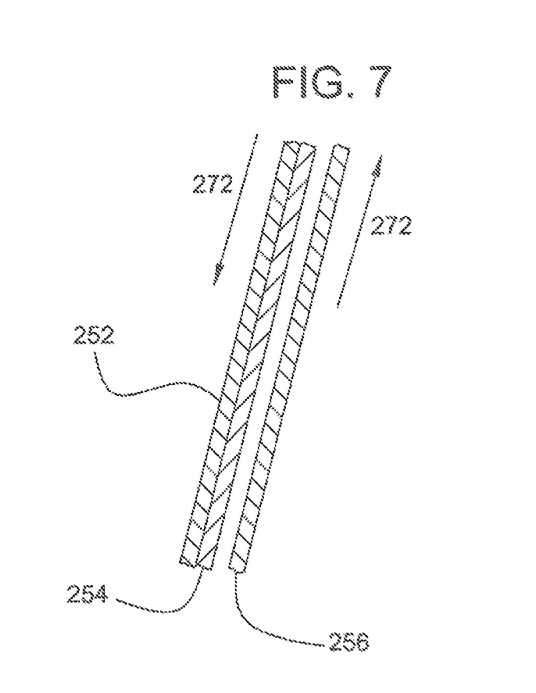
FIG. 7 is a cross-sectional view of the thermoplastic web illustrated in FIG. 5 showing another embodiment of the layers in a delaminated state.
Figure 8:
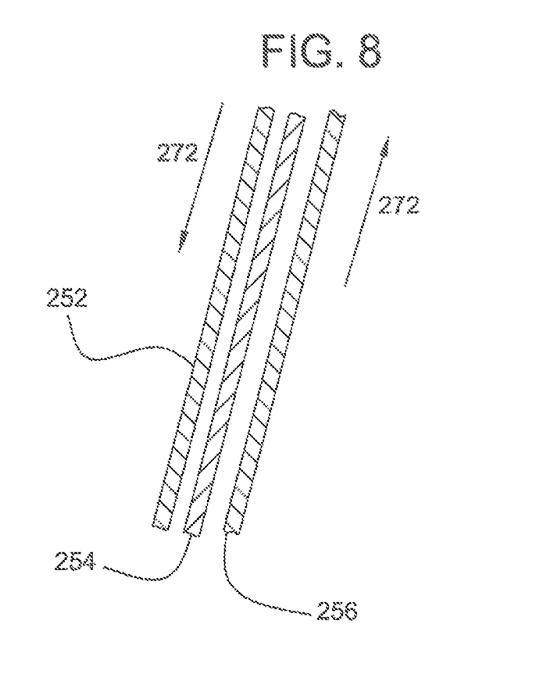
FIG. 8 is a cross-sectional view of the thermoplastic web illustrated in FIG. 5 showing another embodiment of the layers in a delaminated state.

Delamination and separation of the layers may allow the layers to move or slide with respect to each other. An advantage of allowing the layers to delaminate and partially separate from each other when such forces are applied to the web may be an increased resistance to tearing or puncture due to energy absorption of the delaminating layers. When an abrupt force is applied to the sidewall of a bag, delamination and separation of the layers may dissipate some of the applied force by, for instance, allowing the layers to move or slide with respect to each other. Thus, when the bag is used as a liner for a trash receptacle and objects are dropped into the interior volume, the bag may resist tearing and spilling of the contents.

The peel force between layer 252 and layer 254 or between layer 254 and layer 256 in FIG. 5 may have the same peel force information as the peel force information (including the force ranges and the peel force for the one embodiment) as noted with respect to peel force 374 in FIG. 12.

To enable the layers to delaminate and separate, additives may be included with the thermoplastic materials making up the layers. The additives may include anti-blocking agents or slip agents that may resist the tendency of the layers to adhere or stick together, as described herein, as appropriate.

In another embodiment, the layers may be selected from dissimilar thermoplastic materials that may tend not to stick or adhere to each other as described herein, as appropriate. Combinations of such materials for the first layer 252 and third layer 256 may include LLDPE or VLDPE and for the second layer 254 may MDPE, LDPE or HPDE, and other materials discussed herein, as appropriate. However, the layers may demonstrate some level of adhesion or coherence so that the sidewalls will remain intact when the bag is in an unstressed condition.

Figure 9:
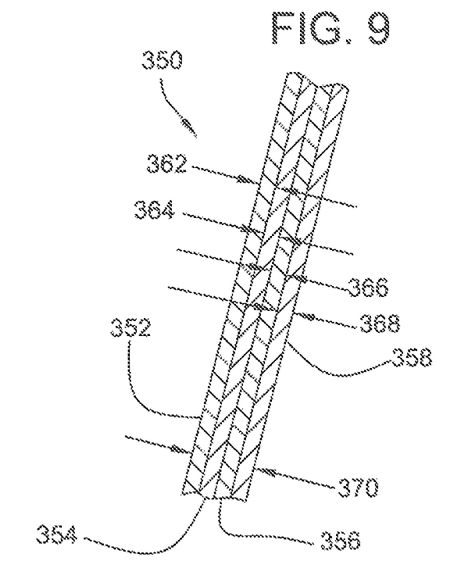
FIG. 9 is a cross-sectional view illustrating another embodiment of a multilayered construction.
Figure 10:
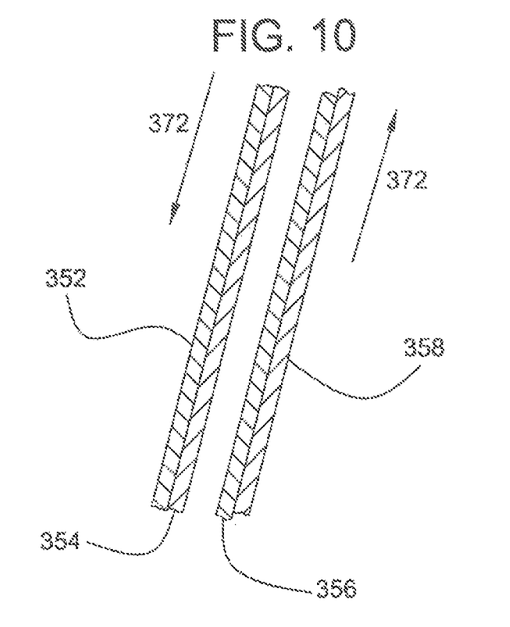
FIG. 10 is a cross-sectional view of the thermoplastic web illustrated in FIG. 9 showing the layers in a delaminated state.

Referring to FIGS. 9 and 10, there is illustrated another embodiment of a multi-layer thermoplastic web material that may be used to make liner bags. The web 350 may include a first layer 352, a second layer 354, a third layer 356, and a fourth layer 368. The layers may be of the same or different thickness and may be made from any of the materials or combinations of materials discussed herein, as appropriate. Also as discussed herein, the layers may adhere or stick together along their adjacent surfaces to provide a unitary sheet-like structure. However, when a sufficient sheer force is applied, the layers may delaminate and move with respect to each other in order to dissipate the applied force.

The layer 352 may have a thickness 362. The thickness 362 may have a first range from about 0.00005 inches (0.000127 cm) to about 0.01 inches (0.0254 cm), a second range from about 0.0001 inches (0.000254 cm) to about 0.005 inches (0.0127 cm), and a third range from about 0.0002 inches (0.000508 cm) to about 0.003 inches (0.00762 cm). In one embodiment, the thickness 362 may be about 0.0002 (0.000508 cm). The layer 352 may have a thickness 364. The thickness 364 may have a first range from about 0.00005 inches (0.000127 cm) to about 0.01 inches (0.0254 cm), a second range from about 0.0001 inches (0.000254 cm) to about 0.005 inches (0.0127 cm), and a third range from about 0.0002 inches (0.000508 cm) to about 0.003 inches (0.00762 cm). In one embodiment, the thickness 364 may be about 0.0002 (0.000508 cm). The layer 356 may have a thickness 366. The thickness 366 may have a first range from about 0.00005 inches (0.000127 cm) to about 0.01 inches (0.0254 cm), a second range from about 0.0001 inches (0.000254 cm) to about 0.005 inches (0.0127 cm), and a third range from about 0.0002 inches (0.000508 cm) to about 0.003 inches (0.00762 cm). In one embodiment, the thickness 366 may be about 0.0002 (0.000508 cm). The layer 358 may have a thickness 368. The thickness 368 may have a first range from about 0.00005 inches (0.000127 cm) to about 0.01 inches (0.0254 cm), a second range from about 0.0001 inches (0.000254 cm) to about 0.005 inches (0.0127 cm), and a third range from about 0.0002 inches (0.000508 cm) to about 0.003 inches (0.00762 cm). In one embodiment, the thickness 368 may be about 0.0002 (0.000508 cm).

The web 350 may have a thickness 370. The thickness 370 may have a first range from about 0.0001 inches (0.000254 cm) to about 0.01 inches (0.0254 cm), a second range from about 0.0002 inches (0.000508 cm) to about 0.005 inches (0.0127 cm), and a third range from about 0.0003 inches (0.000762 cm) to about 0.003 inches (0.00762 cm). In one embodiment, the thickness 370 may be about 0.0008 inches (0.00203 cm).

The layers may be made from flexible or pliable thermoplastic material that may be formed or drawn into a web or sheet. Examples of suitable thermoplastic materials may include polymers, such as, polyethylene (such as, high density polyethylene, low density polyethylene, medium density polyethylene, linear low density polyethylene, very low density polyethylene), polypropylene, polystyrene, ethylene vinyl acetate, nylon, polyester, ethylene vinyl alcohol, or other materials, and may be formed in combinations or mixtures of materials.

The layers 352, 354, 356, 358 may be made of LLDPE, VLDPE, MDPE, LDPE, or HDPE. In one embodiment, the layer 352 may be made of LLDPE, the layer 354 may be made of VLDPE, the layer 356 may be made of MDPE or LDPE, and the layer 358 may be made of a different LDPE.

To enable the layers to delaminate and separate, additives may be included with the thermoplastic materials making up the layers. The additives may include anti-blocking agents or slip agents that may resist the tendency of the layers to adhere or stick together, as described herein, as appropriate.

The thermoplastic materials may also be selected so that the first layer, the second layer, the third layer and/or the fourth layer may delaminate when a force of a sufficient amount is applied to the layers. As illustrated in FIG. 10. the second layer 354 may separate from the third layer 356 when a sheer force 372 is applied. However, in other embodiments, other layers may separate while other layers may remain adjacent and together. For example, referring to FIG. 11, the first layer 352 may separate from the second layer 354, the second layer 354 may separate from the third layer 356, and the third layer 356 may separate from the fourth layer 358 when a sheer force 372 is applied. Additionally, delamination of the layers may occur over their entire surface areas or only in limited areas.

Figure 11:
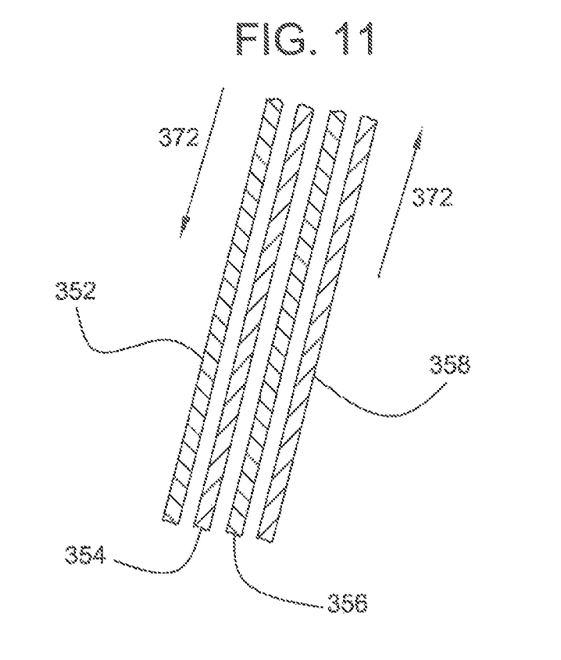
FIG. 11 is a cross-sectional view of the thermoplastic web illustrated in FIG. 9 showing another embodiment of the layers in a delaminated state.

Delamination and separation of the layers may allow the layers to move or slide with respect to each other. An advantage of allowing the layers to delaminate and partially separate from each other when such forces are applied to the web may be an increased resistance to tearing or puncture due to energy absorption of the delaminating layers. When an abrupt force is applied to the sidewall of a bag, delamination and separation of the layers may dissipate some of the applied force by, for instance, allowing the layers to move or slide with respect to each other. Thus, when the bag is used as a liner for a trash receptacle and objects are dropped into the interior volume, the bag may resist tearing and spilling of the contents.

The peel force is a measure of the amount of blocking between layers and increased amounts of blocking lead to a resistance of sheering force. Referring to FIG. 12, a peel force 374 is applied to separate layer 354 from layer 356.

As described herein, allowing the layers to delaminate may improve the strength and tear resistance of the bag. By way of example, a thermoplastic web made from four layers similar to the web in FIG. 9 was compared to a thermoplastic web made from a single layer.

The webs were tested and measured for dart drop resistance and slow puncture strength. The webs were tested and measured for tear strength, and ultimate tensile strength, in the machine direction (MD) and in the transverse direction (TD). "Machine direction" refers to the direction by which the webs are processed or extruded and "transverse direction" is the direction perpendicular to the machine direction. The webs were tested and measured according to ASTM D882-02 for tensile strength testing, ASTM D1922 for tear resistance testing, ASTM D1709 A for dart drop testing, and ASTM F1306 for slow puncture testing, herein incorporated by reference in their entirety.

The multi-layered web demonstrated a 62% increase in tear resistance along the traverse direction compared to the single layer web. The multi-layered web demonstrated a 74% increase in ultimate tensile strength along the machine direction compared to the single layer web, while the ultimate tensile strength in the traverse direction remained consistent. The multi-layered web demonstrated a 29% increase in dart drop resistance compared to the single layer web. The multi-layered web also demonstrated a 44% increase in slow puncture strength compared to the single layer web. The multi-layered web also demonstrated a 14% increase in elongation during the slow puncture test compared to the single layer web. In other embodiments, the sidewall may have three, five, six, seven, eight, nine or more layers.

In other embodiments, the sidewall may have as many as two times the number of layers as are able to be extruded by standard blown film extrusion systems. For example, if five layers were extruded as a tube or bubble and the first side of the tube or bubble was block laminated to the second side of the tube or bubble, then the sidewall of the bag would have ten layers. Similarly, a seven layer extruder may make a fourteen layer sidewall. Also, a nine layer extruder may make an eighteen layer sidewall.

Figure 13:
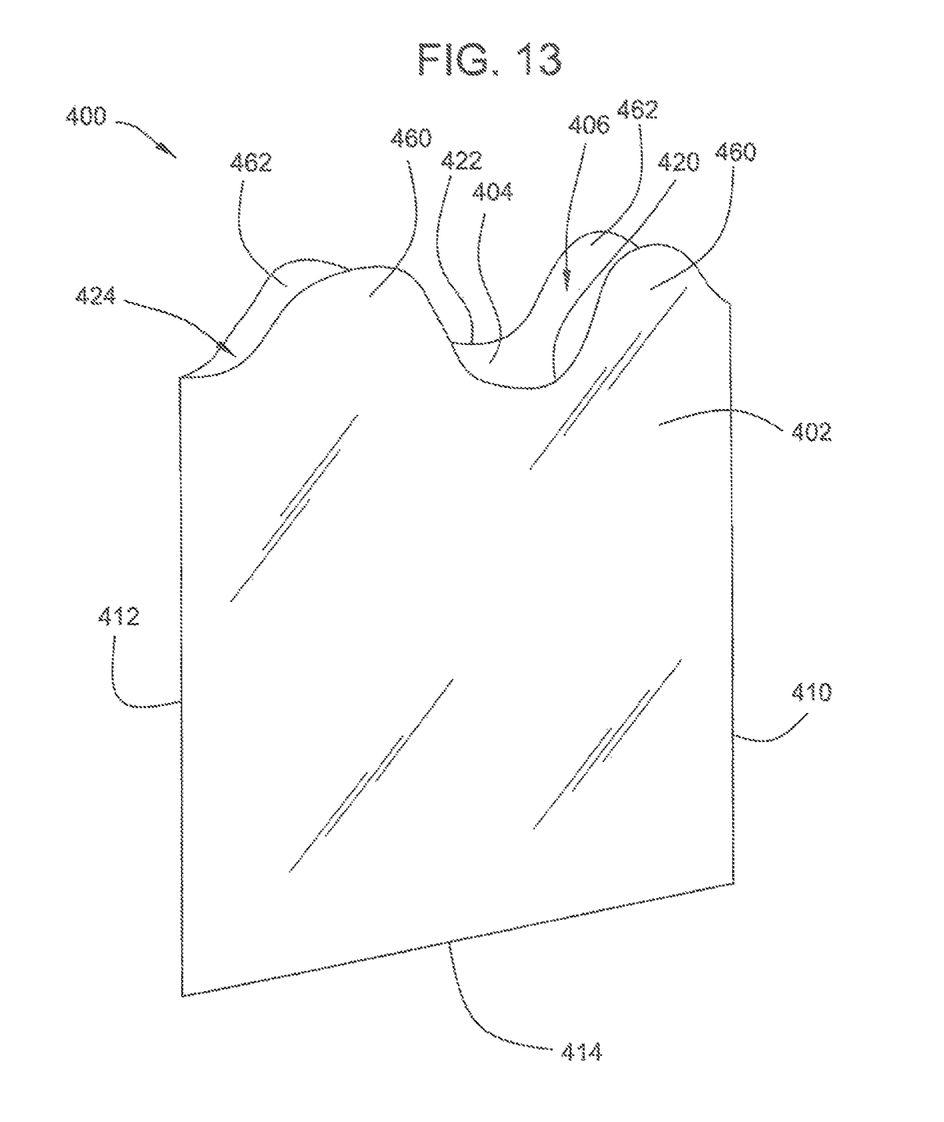
FIG. 13 is a perspective view of another embodiment of a thermoplastic bag suited for use as a trash receptacle liner, the illustrated bag including tie flaps.

Referring to FIG. 13, there is illustrated another embodiment of a plastic bag 400 made from multiple layers of web material that may be suitable for use as a liner for a garbage receptacle. The bag 400 may include a first sidewall 402 of thermoplastic material overlaid and joined to a second sidewall 404 to provide an interior volume 406. The sidewalls may be made from any of the multi-layered thermoplastic webs described herein, as appropriate. The first and second sidewalls 402, 404 may be joined along a first side edge 410, a second side edge 412, and a closed bottom edge 414 extending therebetween. To access the interior volume 406, the top edges 420, 422 of the sidewalls 402, 404 may remain un-joined. To close and seal the opening 424, the bag 400 may be provided with tie flaps 460, 462 that extend as part of the top edges 420, 422 of the sidewalls 402, 404. The tie flaps 460, 462 may be tied together when the bag 400 is removed from the receptacle and disposed of. In addition to tie flaps and draw tapes, other suitable closing mechanisms include twist ties and mechanical clips.

Figure 14:
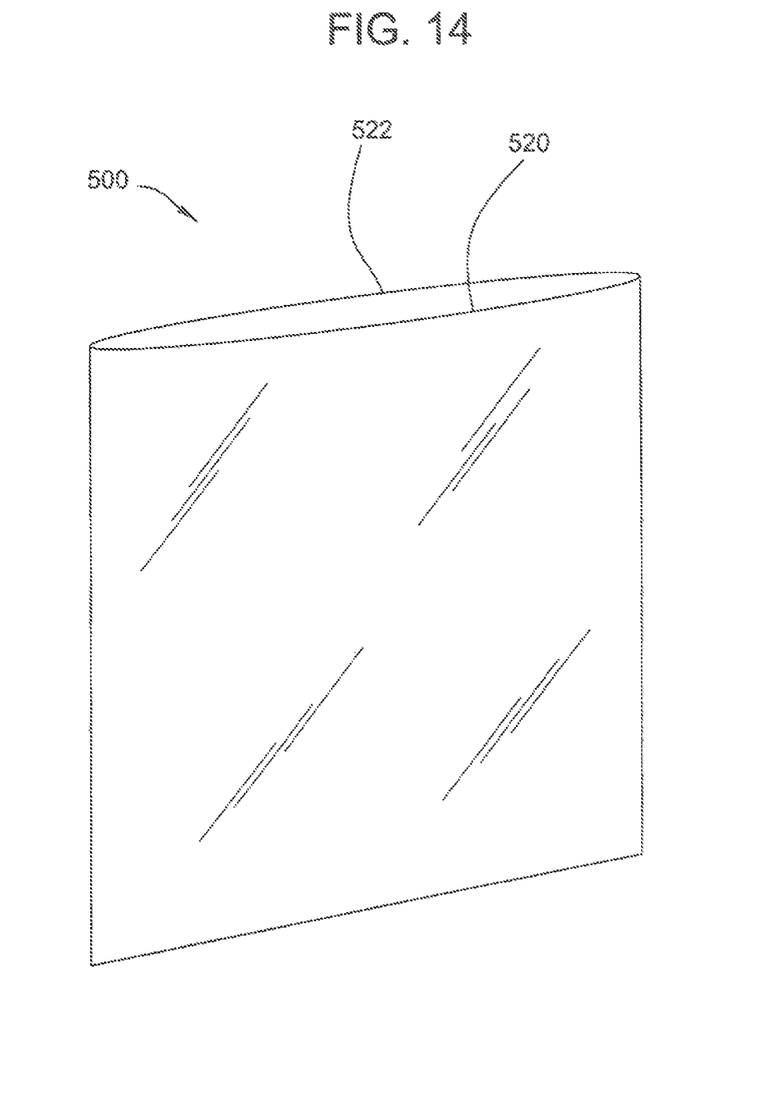
FIG. 14 is a perspective view of another embodiment of a thermoplastic bag.

Referring to FIG. 14, there is illustrated another embodiment of a plastic bag made from multiple layers of web material. The bag 500 may be similar to bag 400 except that the top edges 520, 522 are relatively straight and may not include the flaps.

Figure 15:
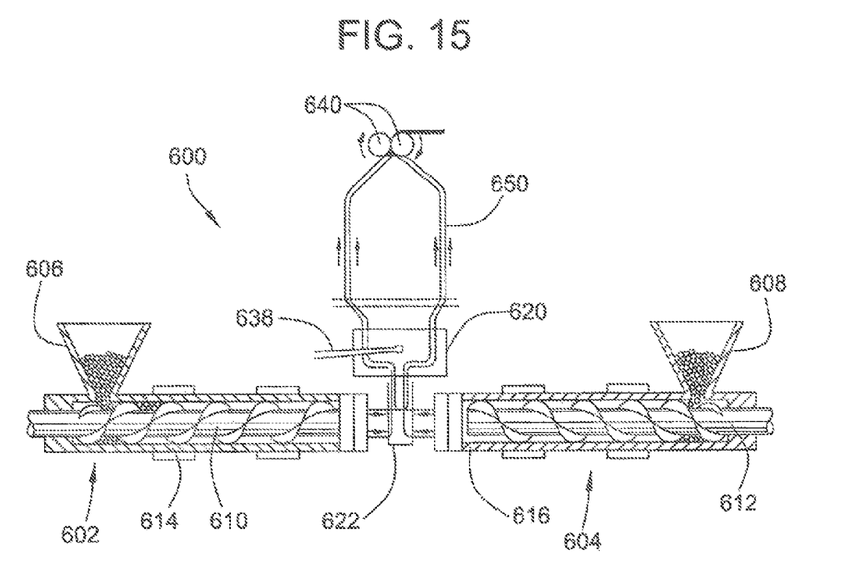
FIG. 15 is a schematic representation of a processing system for processing a multilayer thermoplastic web suitable for making the thermoplastic bag.

To manufacture a multilayered thermoplastic web, a blown film extrusion process may be utilized. The equipment and system for such a process 600 is schematically illustrated in FIG. 15. The blown film extrusion process may utilize a first screw extruder 602 and a second screw extruder 604 that may communicate with a common matrix or die 620. Each extruder 602, 604 may include a respective hopper 606, 608 into which thermoplastic resin material is added. The hoppers 606, 608 may feed the resin material into respective cylindrical bores 614, 616 of each extruder 602, 604. The extruders 602, 604 may heat the resin to a viscous liquid or liquid-like state in which the resin is readily flowable. Located in the respective bores 614, 616 of the extruders 602, 604 may be respective rotating screws 610, 612 which, when turned, drive the thermoplastic resin to the die 620 via pipe lines or channels 622. Because two extruders are provided, two different thermoplastic resins may be directed to the die.

Figure 16:
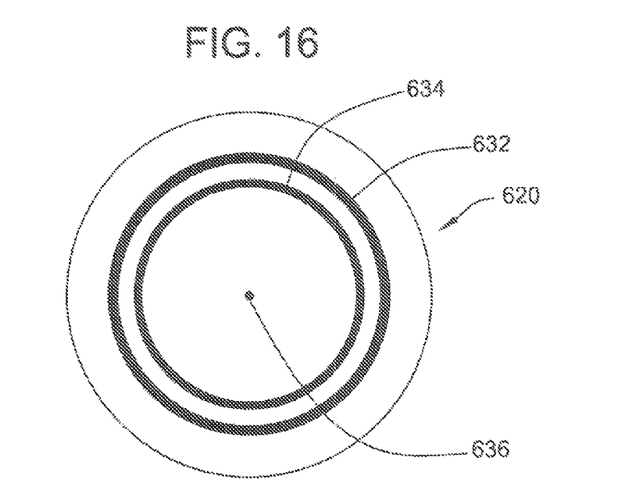
FIG. 16 is a top view of an extrusion die for making multilayered webs or films that may be used in the processing system depicted in FIG. 15.

To form the web in layers as disclosed herein, the die 620 as illustrated in FIG. 16 may have disposed on its top surface an outer annular ring 632 and an inner annular ring 634 that is surrounded by the larger outer ring. The rings 632, 634 may be formed as slots or channels through which the plastic resin may be extruded. The first extruder 602 may communicate with the outer ring 632 while the second extruder 604 may communicate with the inner ring 634. Thus, each of the rings may receive a different thermoplastic material.

Referring to FIG. 15, air or gas may be delivered to the die via an air supply line 638. The gas may exit the die 620 via a gas hole 636 which may be disposed in the center of the first and second rings 632, 634, as illustrated in FIG. 16. The liquid polymer may be expanded around the captured air inside the tube or bubble 450. The air volume and temperature may be regulated by the supply line 638 and the hole 636. The nip rollers 640 may pull the polymer film upwards. Once the thermoplastic tube 650 has been carried upwards from the die 620 some predetermined height, the thermoplastic material may sufficiently cool to form a solid thermoplastic sheet. The specific location at which the material transition occurs will be dependent upon factors such as the thickness of the cylindrical sheet, the type of thermoplastic material, and the pressure of the gas. The rollers 640 may flatten the cylindrical tube 650 together and may direct the web for further processing.

The two extruders and dual-ringed die may facilitate forming a thermoplastic web having multiple layers from which the bag may be made. For example, the plastic resin directed from the first extruder 602 to the outer ring 632 of the die 620 may form the outer layer of the extruded tube 650 and the plastic resin directed from the second extruder 604 to the inner ring 634 may form an inner layer that may be adjacent and laminated to the outer layer. Thus, a two layer thermoplastic web may be produced. Additionally, when the extruded tube 650 is flattened by the rollers 640 positioned above the die 620, the sides of the tube may also laminate together to form a four-layered web. In other embodiments, the dies and layering steps may be altered and modified to produce webs having any various numbers of possible layers. For example, in other embodiments, the web may have three, five, six, seven, eight, or more layers.

Figure 17:
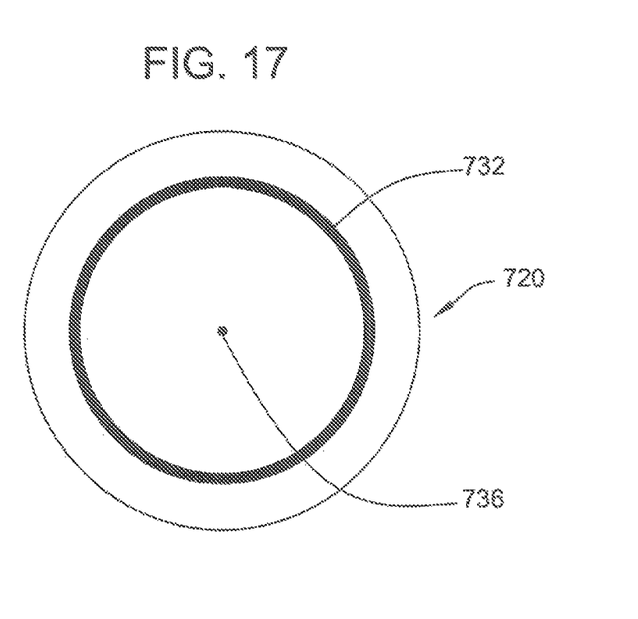
FIG. 17 is a top view of another embodiment of an extrusion die.

Referring to FIG. 17, another embodiment of a die 720 is shown. The die 720 may be similar to die 420 in FIG. 16 except that the die 720 may not include an inner ring. The die 720 may have a ring 732 and a gas hole 736. The ring 732 may receive a first material from a first extruder and a second material from a second extruder. The first and second material may be combined before exiting the ring 732. The first and second materials may not mix together except at the interface of the layer of the first material and the layer of the second material. Thus, the material which exits the ring 732 may have a first layer of the first material and a second layer of a second material. Consequently, a two layer material may be produced. In another embodiment, when the extruded tube is flattened by the rollers positioned above the die 720, the sides of the tube may also laminate together to form a four-layered web. In other embodiments, the dies and layering steps may be altered and modified to produce webs having any various numbers of possible layers. For example, in other embodiments, the web may have three, five, six, seven, eight, or more layers.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those embodiments may become apparent to those of ordinary skill in the art upon reading the foregoing description. The inventor(s) expect skilled artisans to employ such variations as appropriate, and the inventor(s) intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flexible thermoplastic bag comprising:
   a first sidewall of pliable thermoplastic material;
   a second sidewall of pliable thermoplastic material joined to the first sidewall along a first side edge, a second side edge and a closed bottom edge, the first and second sidewalls un-joined along their respective top edges to provide an opening for accessing the interior volume;
   wherein the first sidewall is a multi-layer film including a first layer bonded via co-extrusion to an adjacent second layer and a composition of the thermoplastic material of the first layer and a composition of the thermoplastic material of the second layer are selected such that the co-extrusion bond between the first and second layers at least partially breaks, when subjected to stress consistent with use as a liner for a trash receptacle, causing the first and second layers to at least partially delaminate from each other; and
   wherein the second layer is of a different material than the first layer;
   wherein the edges of the first and second layers of the multi-layer film are heat sealed together thereby preventing separation of the edges of the first and second layers.

2. The bag of claim 1, wherein the first sidewall includes a third layer.

3. The bag of claim 1, wherein the bag further comprises tie flaps extending from the top edges of the first and second sidewalls.

4. The bag of claim 1, wherein the co-extrusion bond between the first and second layers at least partially breaks when objects are dropped into the interior volume of the bag.

5. The bag of claim 1, wherein the materials of the first and second layers are dissimilar thermoplastic materials such that when co-extruded a weak co-extrusion bond is formed.

6. The bag of claim 1, wherein the at least partial breaking of the co-extrusion bond absorbs energy associated with the stress thereby increasing a resistance of the flexible thermoplastic bag to tear due to the stress.

7. A flexible thermoplastic bag comprising:
   a first sidewall of pliable thermoplastic material;
   a second sidewall of pliable thermoplastic material joined to the first sidewall along a first side edge, a second side edge and a closed, folded bottom edge, the first and second sidewalls un-joined along their respective top edges to provide an opening for accessing the interior volume;
   the first sidewall and second sidewall forming a hem, the hem having a hem seal and a draw tape within the hem;
   wherein the thermoplastic material of the first and second sidewalls consists essentially of a thermoplastic, multilayer laminate film comprising:
   a first layer of thermoplastic material; and
   an adjacent second layer of thermoplastic material, wherein the first and second layers are co-extruded and the first and second layers of the multi-layer laminate film are selected so that the first and second layers at least partially delaminate from each other upon the application of a force consistent with use as a liner for a trash receptacle due to a co-extrusion bond between the first and second layers at least partially breaking; and wherein the first and second layers are of different materials and are selected from the group of materials consisting of high density polyethylene, low density polyethylene, medium density polyethylene, linear low density polyethylene, very low density polyethylene, polypropylene, ethylene vinyl acetate, nylon, polyester, and ethylene vinyl alcohol;
   wherein the edges of the first and second layers of the multi-layer laminate film are heat sealed together thereby preventing separation of the edges of the first and second layers.

8. The film of claim 7, wherein the first layer comprises linear low density polyethylene and the second layer comprises very low density polyethylene.

9. The film of claim 7, wherein the first layer comprises linear low density polyethylene and the second layer comprises medium density polyethylene.

10. The film of claim 7, wherein the first layer comprises very low density polyethylene and the second layer comprises medium density polyethylene.

11. The bag of claim 7, wherein at least one of the first and second layers include an anti-blocking agent.

12. The bag of claim 7, wherein the co-extrusion bond between the first and second layers at least partially breaks when objects are dropped into the interior volume of the bag.

13. The bag of claim 7, wherein the materials of the first and second layers are dissimilar thermoplastic materials such that when co-extruded a weak co-extrusion bond is formed.

14. The bag of claim 7, wherein the at least partial breaking of the co-extrusion bond absorbs energy associated with the force thereby increasing a resistance of the flexible thermoplastic bag to tear due to the force.

15. A bag comprising:
   first and second sidewalls comprising a thermoplastic multi-layer film, the multi-layer thermoplastic film comprising:
   a first layer,
   a second layer, and
   a continuous co-extrusion bond securing the first layer directly to the second layer, the continuous co-extrusion bond having a tailored strength such that co-extrusion bond at least partially breaks causing at least partial delamination of the first layer and the second layer when objects are dropped into an interior volume of the bag;
   a first side heat seal securing the first and second sidewalls together, the first side heat seal securing first side edges of the first and second layers together thereby preventing the first side edges of the first and second layers from delaminating from each other; and
   a second side heat seal securing the first and second sidewalls together, the second side heat seal securing second side edges of the first and second layers together thereby preventing the second side edges of the first and second layers from delaminating from each other.

16. The bag as recited in claim 15, further comprising:
a hem;
a hem seal securing top edges of the first and second layers together thereby preventing the top edges of the first and second layers from delaminating from each other; and
a drawtape positioned within the hem.

17. The bag as recited in claim 15, wherein materials of the first and second layers are dissimilar thermoplastic materials that form a weak co-extrusion bond when co-extruded together.

18. The bag as recited in claim 17, wherein: the first layer comprises a polyethylene material and the second layer comprises polypropylene or polystyrene.

19. The bag as recited in claim 15, wherein the multi-layer thermoplastic film comprises:
a third layer; and
a second co-extrusion bond securing the first layer directly to the third layer, the second co-extrusion bond having a tailored strength such that second co-extrusion bond prevents delamination of the first layer and the third layer during normal use of the bag.

20. The bag as recited in claim 19, the multi-layer thermoplastic film comprises:
a fourth layer; and
a third co-extrusion bond securing the second layer directly to the fourth layer, the third co-extrusion bond having a tailored strength such that third co-extrusion bond prevents delamination of the second layer and the fourth layer during normal use of the bag.

* * * * *